2,706,258

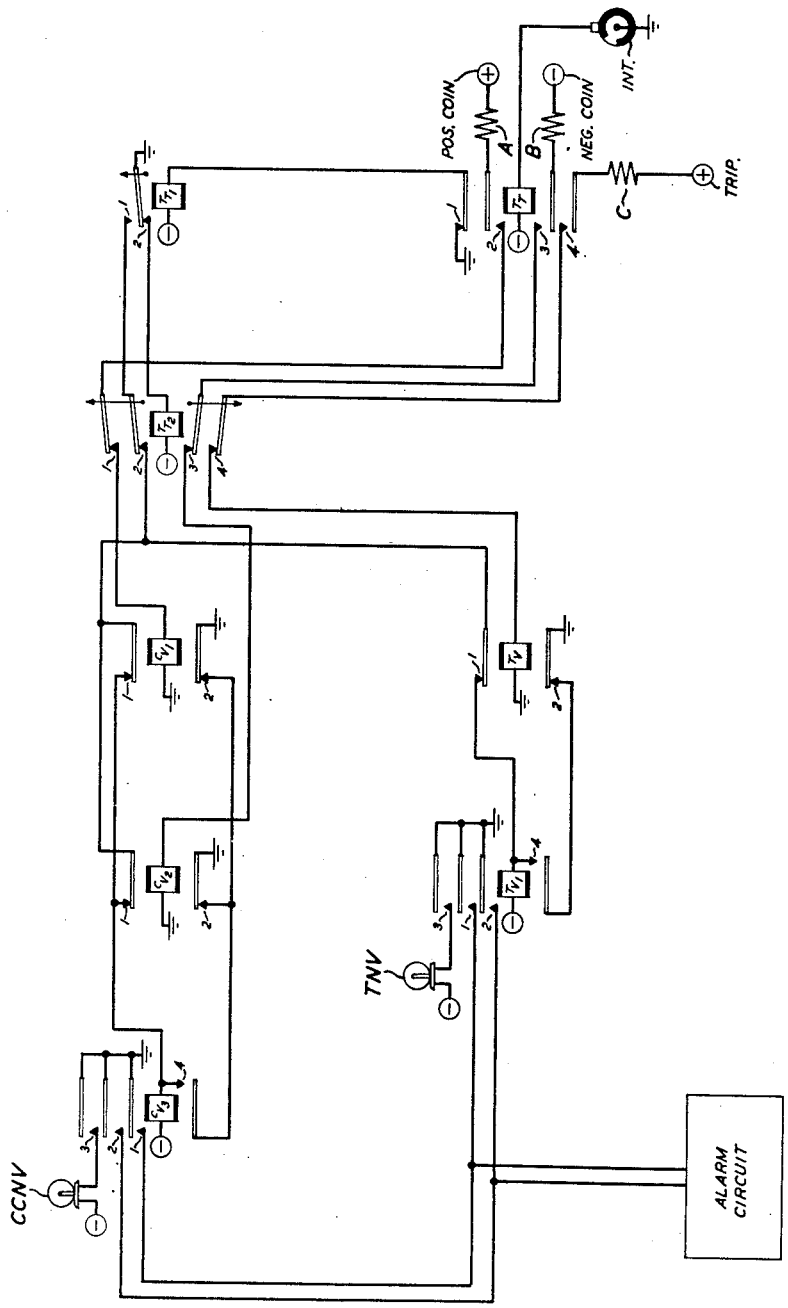

VOLTAGE TESTING CIRCUIT

John K. Mills, Morristown, N. J., and Walter S. Ross, Port Washington, N. Y., assignors to Bell Telephone Laboratories, Incorporated, New York, N. Y., a corporation of New York Application June 16, 1951, Serial No. 232,044

1 Claim. (Cl. 307—132)

This invention is an alarm circuit for a battery of small capacity.

An object of the invention is to provide an alarm circuit for a battery of small capacity.

There are numerous battery supply circuits in which the battery is of small capacity and in which the function of the battery is vital. It is frequently necessary therefore to test the battery practically constantly to insure that it is in proper condition for supplying potential to the circuit which it is required to serve.

In the telephone communication plant there are a number of instances of such batteries. There are, for instance, in addition to the regular battery sources for different special services, smaller reserve batteries which are required to serve only in emergencies and, almost invariably in such emergencies, for only short intervals. Under such circumstances the provision of batteries of relatively large capacity is not justified economically. In order to insure that such standby batteries are in proper condition for service, if required, it is desirable to insure that their potentials are at a proper value at all times so that in the event that they are required to be connected into service they will be in proper condition to perform their functions and it is required further to test them regularly and continuously while they are in service.

Examples of such batteries of small capacities are the so-called reserve tripping battery, the function of which is to operate a relay to cut off ringing instantly if a telephone is answered during a silent interval between rings to prevent ringing in the subscriber's ear. Another example is the reserve batteries, one positive and the other negative, which control the collection or return of coins in telephone pay station service. The potentials of the batteries employed in these special services differ from that of the batteries used for talking and for performing the usual relay switching functions and are generally higher. While the capacities of the regular batteries which perform the tripping and coin control and other special functions may be substantial, the capacities of the reserve batteries are small and the batteries frequently consist of dry cells.

Any voltage testing arrangement for such batteries which required a constant drain on the batteries of any but the smallest current magnitude, considering their small capacity, would be unsuitable. The present invention affords a means of testing such batteries regularly and practically continuously and yet places only a small drain on the batteries.

The invention may be understood from the following description when read with reference to the associated drawings which, taken together, disclose a preferred embodiment in which the invention is presently incorporated. It is to be understood, however, that the invention may be incorporated in other embodiments which will be suggested to those skilled in the art from a consideration of the following.

In the drawing, at the lower right, there are shown three batteries, each of small capacity, which may, for instance, be in each instance a single series connected group of dry cells, to make up the required potential for each service. The batteries illustrated are the reserve batteries for coin collect, designated POS COIN, for coin return, designated NEG COIN, and for tripping ringing, designated TRIP, which are connected individually through resistors A, B and C respectively to the armatures associated with contacts 2, 3 and 4 of relay TT. A path may be traced from battery through the winding of relay TT to a brush contact on the interrupter INT. The interrupter is arranged so that it rotates through a single revolution in an interval of six seconds, for instance, and during two seconds, for instance, of this interval a path is closed through the interrupter to ground, operating relay TT for two seconds out of every six. Relay TT1 is operated for four seconds out of every six while relay TT is released over a circuit which extends from battery through the winding of relay TT1 and the closed contact 1 of relay TT to ground. While relay TT1 is operated relay TT2 is operated from battery through the winding of relay TT2 and through contact 2 of relay TT1 to ground.

During the approximately two seconds while relay TT is operated, ground will be disconnected from the winding of relay TT1. The release of relay TT1 is delayed for a short interval, due to the slow-to-release characteristic of relay TT1. After relay TT1 releases, relay TT2 will not release instantly, as it too is a slow-to-release relay. Relay TT2 will remain operated for an interval after relay TT operates only long enough for slow-to-release relays TT1 and TT2 to release in sequence and it is only during this relatively short portion, measured in milliseconds, of the two-second interval during which the small capacity batteries are connected through the contacts of relay TT that there is any drain from the batteries through the contacts of relay TT2 to their respective alarm circuits.

The positive coin battery extends through resistance A, contact 2 of relay TT and, during an interval of say ten milliseconds, through contact 1 of relay TT2 and the winding of relay CV1 to ground operating relay CV1 if the potential of the positive coin battery is normal. Similarly negative coin battery will be connected through resistance B, contact 3 of relay TT, contact 3 of relay TT2, and the winding of relay CV2 to ground, operating relay CV2 if the potential of the negative coin battery is normal. Positive tripping battery will be connected through resistance C, contact 4 of relay TT, contact 4 of relay TT2, and the winding of relay TV, operating relay TV, if the potential of the positive tripping battery is normal. The failure of any of relays CV1, CV2 or TV to operate indicates a failure of the potential of its respective connected small capacity battery.

If one or the other of relays CV1 or CV2 fails to operate, during the interval after relay TT1 releases and before relay TT2 releases, a circuit may be traced from ground through contact 1 of relay TT1, contact 2 of relay TT2, to parallel branches at contact 1 of each of relays CV1 and CV2. If either or both of these relays fail to operate the path is continued through its respective contact 1, or both contacts 1, depending upon the condition, and through the winding of relay CV3 to battery operating relay CV3, which in that event locks over a circuit from battery through its winding and contact 4, and contact 2 of relay CV1 or CV2, or both, depending upon the condition, to ground. The operation of relay CV3 establishes a circuit from ground through its contact 3 and the filament of the coin collect no voltage lamp CCNV to battery, lighting the lamp as an indication of the condition. The operation of relay CV3 also establishes paths from ground through its contacts 1 and 2 to the alarm circuit, indicated by a rectangle, to operate other visual and audible alarms well known in the art.

After the condition has been corrected, on the following cycle of operation both relays CV1 and CV2 will operate unlocking relay CV3, extinguishing the lamp and releasing the alarm circuit.

In a similar manner relay TV will be operated periodically over a path from battery TRIP through resistor C, contact 4 of relay TT, contact 4 of relay TT2 and the winding of relay TV to ground, if the tripping battery is normal. If relay TV fails to operate, ground will be supplied through contact 1 of relay TT1, contact 2 of relay TT2, contact 1 of relay TV and the winding of relay TV1 to battery, operating relay TV1, which locks through its contact 4 to contact 2 of relay TV. Two circuit paths are established to the alarm circuit from ground through contacts 1 and 2 of relay TV1 and the no-tripping voltage alarm lamp TNV is lighted from ground through contact 3 of relay TV1 to indicate the condition.

After the condition is corrected relay TV operates on the succeeding cycle to release relay TV1 and restore the circuit to normal.

Attention is called to the fact that whereas in the embodiment illustrated in the drawing the draining time of the battery is measured by the release time of two relays releasing in sequence the circuit may be modified so that the draining is measured by the release time of but a single relay or, if desired, by three or more relays.

What is claimed is:

In a communication system, a first direct-current potential source of small capacity and a low-current drain testing circuit therefor, said circuit having means for testing the potential of said source regularly approximately ten times per minute for periods of about ten milliseconds each time, said circuit comprising a cyclically operable rotatable interrupter, a first relay having a first winding thereon, a first relay circuit directly connecting said interrupter, said winding and a second potential source, means in said interrupter for operating said first relay for a first interval and for releasing said first relay for a second and substantially longer interval during each cycle, a first contact on said first relay, a second relay having a second winding thereon, a second relay circuit directly connecting said first contact, said second winding and said second potential source, means connected directly to said first contact for operating said second relay when said first relay is released and for releasing said second relay when said first relay is operated, a second contact on said second relay, a third relay having a third winding thereon, a third relay circuit directly connecting said second contact, said third winding and said second potential source, means directly connected to said second contact for operating said third relay when said second relay is operated and for releasing said third relay when said second relay is released, a third contact on said third relay, a fourth contact on said first relay, a fourth relay having a fourth winding thereon, a fourth relay circuit connecting said direct-current potential source of small capacity through said fourth contact when said first relay is operated, said third contact, during an interval of about ten milliseconds before said third relay releases and said fourth winding, said fourth relay a potential testing means for said potential source of small capacity, means for preventing the operation of said fourth relay when the potential of said low-capacity source is below a predetermined minimum and an alarm circuit responsive to the non-operation of said fourth relay, said alarm circuit comprising a fifth relay responsive to a circuit path extending through other contacts on said second, third and fourth relays.

References Cited in the file of this patent

UNITED STATES PATENTS

| | | |
|---|---|---|
| 1,620,169 | Sorensen | Mar. 8, 1927 |
| 2,265,203 | Six | Dec. 9, 1941 |
| 2,382,140 | Culbertson | Aug. 14, 1945 |
| 2,403,744 | Nicholson | July 9, 1946 |
| 2,465,794 | Fereday | Mar. 29, 1949 |
| 2,539,206 | Robinson | Jan. 23, 1951 |